Patented May 9, 1933

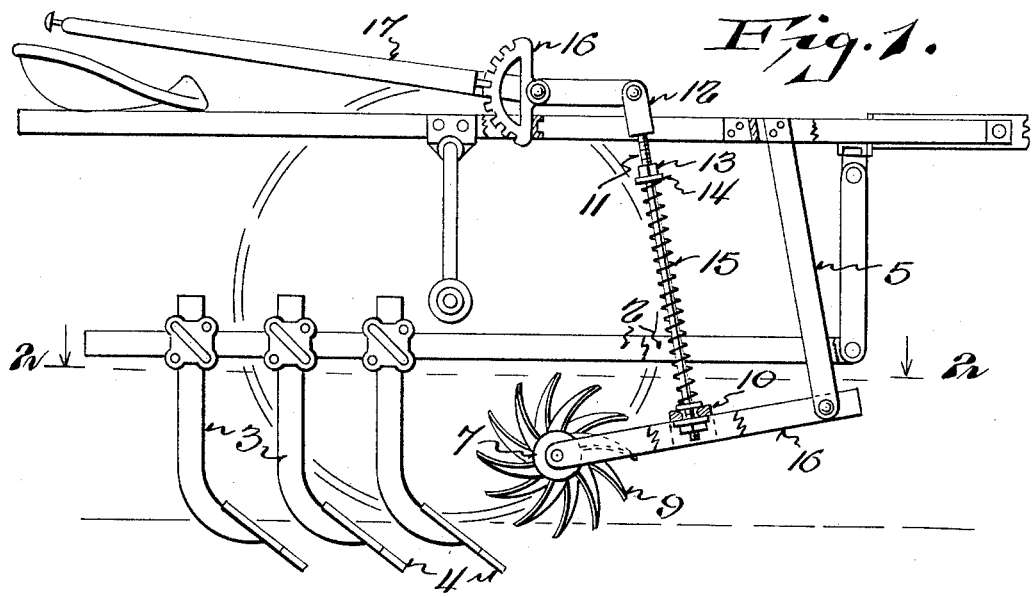
Fig. 1.
Fig. 2.
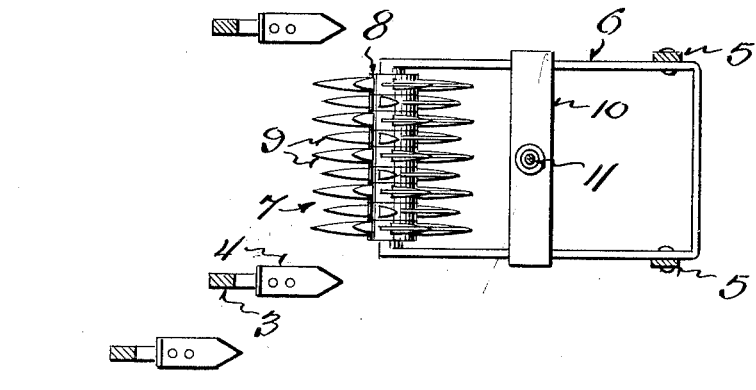

1,908,110

UNITED STATES PATENT OFFICE

OSWIN BRAUN, OF CROSS PLAINS, WISCONSIN

ROTARY HOE ATTACHMENT FOR CULTIVATORS

Application filed September 26, 1931. Serial No. 565,259.

This invention pertains to cultivators, and more particularly to a rotary hoe attachment for conventional cultivators used for row crops such as corn and the like.

The ordinary fixed tooth cultivator used upon row crops has been found deficient, in that it is impossible to cultivate the ground and eliminate small weeds closely adjacent the rows and between successive plants.

It is therefore the primary object of the present invention to provide an attachment for conventional row crop cultivators, such as illustrated, which will effectively cultivate the soil closely surrounding each plant, thus eliminating all weeds and conditioning the soil to produce the most desirable results.

Incidental to the foregoing, a more specific object resides in the provision of an attachment consisting of a rotary hoe, resiliently and adjustably carried by the cultivator frame, and positioned in the space between the transverse sets of cultivator teeth to ride over the row in such manner that the ground surrounding the plant and necessarily missed by the cultivator teeth is entirely cultivated without damage to the plants.

With the above and other objects in view, which will appear as the description proceeds, the invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing is illustrated one complete example of the physical embodiment of the present invention constructed according to the best mode so far devised for the practical application of the principles thereof.

Figure 1 is a fragmentary elevation of a conventional row crop cultivator with the present invention applied thereto, parts being broken away and in section to more clearly illustrate structural details, and Figure 2 is a plan section taken on the line 2—2 of Figure 1.

Referring now more particularly to the accompanying drawing, the numeral 1 designates the main frame of a conventional cultivator supported in the usual manner upon wheels indicated by dotted lines.

Supported below the main frame in the usual manner is a pair of beams 2, each of which carries a set of depending arms 3 provided with the usual cultivator teeth or shares 4.

While a specific type of tooth cultivator has been illustrated, it is to be understood that the invention is equally applicable to various structures, and therefore the cultivator forms no part of the invention other than in the combination, as hereinafter claimed.

Secured to the main frame of the cultivator is a pair of spaced depending arms 5 having pivotally connected to their lower ends a yoke or frame 6 having a rotary hoe 7 revolubly carried at its rear end, the hoe 7 comprising a hub 8 provided with staggered, arcuate teeth 9 similar in construction to conventional rotary hoes now on the market.

Connecting the arms of the yoke 6 is a transverse strap 10 having secured therein a rod 11 threaded at its upper end for reception of the clevis 12. Threaded on the upper end of the rod 11 is a nut 13 which retains the washer 14, and disposed between the washer 14 and strap 10 is an expansible coil spring 15 which serves to create a tension upon the yoke or frame 5, as will be hereinafter described.

Secured to a portion of the main frame 1 is a detent 16 to which is pivotally connected a hand lever 17, the free end of which is pivotally connected to the clevis 12.

As will be noted in Figure 2, the rotary hoe 7 carried by the yoke 6 is positioned immediately ahead and between the transverse sets of cultivator teeth 4.

From the foregoing explanation, it is believed that the operation of the present invention will be quite apparent in that as the cultivator is drawn over a row of crops with the transverse sets of cultivator teeth positioned upon opposite sides of the row, the rotary hoe 7 will pass directly over the row, thus serving to cultivate the ground immediately surrounding the plants and missed by the opposite sets of cultivator teeth.

In practise it has been found that the cultivator hoe serves to effectively cultivate the soil without mutilation of the plants, inasmuch as the same has a rolling action, and therefore all weeds closely surrounding the plants and inaccessible to the cultivator teeth are eliminated. It is believed that the result will be quite obvious in that complete elimination of weeds is obtained and the soil left in condition to produce the most desirable results.

It has been found in some instances, particularly where the ground may be of a hard nature, that the mere weight of the hoe 7 is not sufficient to penetrate and cultivate the same. Therefore it is desired to regulate tension on the hoe, this being accomplished by adjustment of the hand lever 17 which forces the rod 11 through the strap 10, increasing the tension upon the spring 15. The resilient mounting thus described also serves to compensate for unevenness in the ground between the cultivator hoe and the supporting wheels. When it is desired to raise the cultivator hoe for transportation, or other reasons, the hand lever 17 is swung downwardly on the detent 16, causing the rod 11 to lift the yoke 6 and raise the hoe 7 to clear the ground or crops.

While a specific form of the attachment has been illustrated and described, it will be appreciated that various modifications may be employed, inasmuch as the salient feature of the invention resides in the adjustable and resilient connection between the hoe and cultivator frame to provide for the desired penetration of the rotary hoe as well as to compensate for unevenness in the ground and raising the hoe when its use is not desired.

I claim:—

In combination with a row crop cultivator provided with a frame and spaced sets of cultivator teeth disposed on opposite sides of the longitudinal center of the frame, of spaced depending arms secured to the frame and terminating below the same, a single piece U-shaped yoke frame including spaced parallel arms and a front connecting piece, the yoke frame being of substantially the same width as a set of cultivator teeth and disposed between the sets of cultivator teeth and arranged at the longitudinal center of the frame, bearings carried by the rear ends of the parallel arms, a rotary hoe including a shaft mounted in said bearings and a plurality of rotary teeth on the shaft confined between said bearings, the forward end of the yoke frame being pivotally connected to and disposed between the lower ends of the depending arms in contact therewith, whereby lateral shifting of the yoke frame is prevented, a strap connected to the parallel arms intermediate their ends, and an expansion spring engaging the central portion of the strap, whereby the pivots and the spring forms a three-point suspension for the yoke frame, the engagement of the spring with the central portion of the strap insuring the even distribution of pressure on said yoke frame.

In testimony that I claim the foregoing I have hereunto set my hand at Cross Plains, in the county of Dane, and State of Wisconsin.

OSWIN BRAUN.